United States Patent
Fukui et al.

[15] 3,705,718
[45] Dec. 12, 1972

[54] HIGH EFFICIENCY LEAF SPRING

[72] Inventors: Hiroshi Fukui, Gifu-ken; Gakuji Iwatsu, Tokai; Junichi Kato, Nagoya, all of Japan

[73] Assignee: Aichi Steel Works Limited, Araomachi, Tokai-shi, Aichi-ken, Japan

[22] Filed: Jan. 5, 1971

[21] Appl. No.: 104,018

[30] Foreign Application Priority Data

Jan. 22, 1970 Japan ................................. 45/6150

[52] U.S. Cl. .................................................. 267/47
[51] Int. Cl. .................................................. F16f 1/18
[58] Field of Search .......................................... 267/47

[56] References Cited

UNITED STATES PATENTS

| | | | |
|---|---|---|---|
| 3,490,758 | 1/1970 | Foster | 267/47 |
| 3,452,974 | 7/1969 | Dixon | 267/47 |

*Primary Examiner*—James B. Marbert
*Attorney*—Karl W. Flocks

[57] ABSTRACT

A high efficiency leaf spring which has a circularly arcuate shape in transverse cross section, the radius of curvature of said circularly arcuate shape continuously being increased with the bending moment progressively decreasing from a point where it is largest, based upon a logical analysis and development, so that the maximum tensile stress may be uniform over the entire length of the spring.

3 Claims, 14 Drawing Figures

PATENTED DEC 12 1972 3,705,718

INVENTOR
Hiroshi Fukui
Gakuji Iwatow
Junichi Kato

BY
ATTORNEY

HIGH EFFICIENCY LEAF SPRING

BACKGROUND OF THE INVENTION

A suspension leaf spring, as seen in an automobile, is composed of a main leaf and a plurality of shorter or adjoining leaves to constitute a laminated leaf spring. The main leaf is longest in length and the shorter or adjoining leaves are laminated on the underside of said main leaf in such a manner that the length thereof is progressively reduced downwardly. Namely, the thickness of the laminated leaf spring is made largest at the central or loading point where the maximum bending moment is exerted, and is progressively decreased towards the opposite ends, so that uniform distribution of a maximum tensile stress may be obtained when a load is imposed on the spring. The leaf spring of the type described has the disadvantages that it is heavy in weight and calls for a number of steps in the production procedures, and that the inter-leaf friction is great. In order to obviate such disadvantages, it has been proposed to use a long tapered leaf spring which is substantially rectangular in cross-sectional shape and the thickness of which is progressively decreased towards the opposite ends, or a channel-shaped leaf spring, as a single leaf.

However, the long tapered leaf spring described above involves much difficulty in the production procedures, particularly in the rolling of a blank material, and has not widely been used as yet. On the other hand, the channel-shaped leaf spring, as described in U. S. Pat. No. 3,452,974, is characterized by the fact that it is formed into a channel shaped cross-section with longitudinal flanges formed by bending an elongate sheet material, whereby the neutral axis is shifted towards the surface of maximum tensile stress and a load exerted thereon is balanced mainly by the compressive stress, by taking advantage of the strength characteristic of steel, i.e. the fact that steel is stronger against compression than tension. In this case, the height of the flanges is varied so as to obtain a leaf spring of constant surface stress. In this type of leaf spring, however, the stress distribution in the transverse cross-section is the same as that of the conventional laminated leaf spring, and is uniform over the entire width thereof. Therefore, there are increasing changes of occurrence of concentrated stress which can be a cause of fatigue failure, and hence prolongation of the fatigue life cannot be expected. In addition, it is not easy to design and produce this type of leaf spring.

SUMMARY OF THE INVENTION

The present invention has been achieved with a view to providing a leaf spring which is free of the above-described disadvantages of the conventional ones. The leaf spring according to the present invention has been obtained based upon a logical analysis which was conducted to obtain uniform surface stress in the most logical manner, and, therefore, can be easily designed and produced. The measurements taken on the actual leaf spring of the invention have proved to well coincide with the theoretical values. Furthermore, according to the present invention a substantial weight reduction or substantial increase in fatigue strength becomes possible as compared with the laminated leaf spring, which could not sufficiently be achieved by the conventional long tapered leaf spring or channel-shaped leaf spring.

The leaf spring of this invention is made from an elongate sheet material having a uniform cross-sectional shape or the like material, by hot working or other methods, and is a high efficiency leaf spring which has a circularly arcuate or the like shape in the transverse cross-section, the radius of curvature of said circularly arcuate shape being continuously increased as the bending moment progressively decreases towards the ends from the anchoring point of the spring where said bending moment is largest, based upon a logical analysis and development to be described later.

Namely, since the leaf spring of the invention has a circularly arcuate shape in the transverse cross section as described above, the neutral axis in the arcuate shape shifts towards the surface of maximum compressive stress as compared with a flat bar, but the strength of the leaf spring is increased by the increasing geometrical moment of inertia and modulus of section. Consequently, the maximum tensile stress can be maintained at a low value.

DESCRIPTION OF THE PREFERRED EMBODIMENTS

Figure 1:
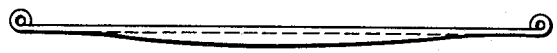
FIG. 1 is a side elevational view exemplifying the leaf spring according to the present invention.
Figure 2:
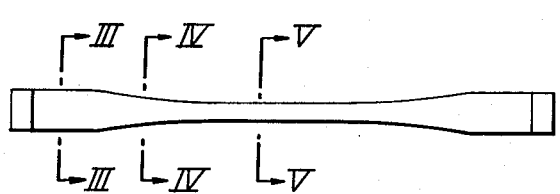
FIG. 2 is a plan view of the leaf spring shown in FIG. 1.
Figure 3:
FIG. 3 is an enlarged cross-sectional view taken on the line III—III of FIG. 2.
Figure 4:
FIG. 4 is an enlarged cross-sectional view taken on the line IV—IV of FIG. 2.
Figure 5:
FIG. 5 is an enlarged cross-sectional view taken on the line V—V of FIG. 2.

In FIG. 1 there is shown a typical example of the semi-elliptic spring according to the present invention. FIG. 2 is a plan view of the spring shown in FIG. 1 and FIGS. 3, 4 and 5 are enlarged cross-sectional views taken on the lines III—III, IV—IV and V—V of FIG. 2 respectively.

Hereinafter, the mechanical analysis of the leaf spring of the instant invention will be described in detail.

In general, when a bending moment is applied to a simple beam, the maximum tensile stress $\sigma$ exerted on said beam is represented by the following equation:

$$\sigma = M/Z \quad (1)$$

wherein M stands for bending moment and Z stands for the modulus of section of the beam.

Figure 6:
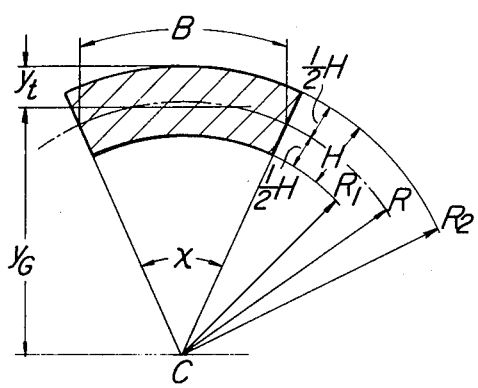
FIG. 6 is a diagram for explaining the manner of calculating the modulus of section of the beam.

The manner of calculating the modulus of section of a beam, which is circularly arcuate in the transverse cross-section, will be explained with reference to FIG. 6. FIG. 6 shows the transverse cross-section of a flat steel bar for spring which has a width B and a thickness H, and which is bent transversely into a circularly arcuate shape with a radius of curvature R. Reference character C designates the center of the circular arc with the radius of curvature R; $R_1$ and $R_2$ designate the distances from the center C to the inner circumference and outer circumference respectively; $x$ designates the angle (radian) of the circular arc defined by B and R; $y_G$ designates the distance from the center C to the neutral plane of the circular arc; and $y_t$ designates the distance from the neutral plane to the plane which is subjected to the maximum tensile stress. With $I_z$ representing the geometrical moment of inertia, the modulus of section Z is represented by the following equation:

$$Z = I_z/y_t \quad (2)$$

In Equation (2) above, $I_z$ and $y_t$ are respectively represented by the following equations:

$$I_z = \frac{1}{8}(x + \sin x)(R_2^4 - R_1^4)$$
$$- \left\{ \frac{4}{3} \left( \frac{R_2^3 - R_1^3}{R_2^2 - R_1^2} \right) \frac{\sin \frac{x}{2}}{x} \right\}^2 \left\{ \frac{1}{2}(R_2^2 - R_1^2)x \right\} \quad (3)$$

$$y_t = R_2 - (4/3) \cdot (R_2^3 - R_1^3/R_2^2 - R_1^2) \cdot [(\sin x/2)/x] \quad (4)$$

Further, $$R_1 = R - \tfrac{1}{2}H$$
$$R_2 = R + \tfrac{1}{2}H$$
$$H = B/a$$

(wherein $a$ stands for the width to thickness ratio)
Therefore, Equations (3) and (4) can be re-written as follows: $I_z = [\tfrac{1}{8}(4/ax^3 + 1/a^3x)(x + \sin x) - 1/a(2/x^2 + 1/6a^2)^2 \sin^2 x/2]B^4$ \quad (5)

$$y_t = [(1/x + 1/2a) - (2/x^2 + 1/6a^2) \sin x/2]B \quad (6)$$

Since $B$ and $a$ are constants inherent to the flat steel bar, by incorporating Equation (5) and (6) in Equation (2) the modulus of section Z of the circularly arcuate shape can be obtained from the following equation as a function of $x$:

$$Z = \frac{\tfrac{1}{8}\left(\tfrac{4}{ax^3} + \tfrac{1}{a^3x}\right)(x + \sin x) - \tfrac{1}{a}\left(\tfrac{2}{x^2} + \tfrac{1}{6a^2}\right)^2 \sin^2 \tfrac{x}{2}}{\left(\tfrac{1}{x} + \tfrac{1}{2a}\right) - \left(\tfrac{2}{x^2} + \tfrac{1}{6a^2}\right) \sin \tfrac{x}{2}} \cdot B^3 \quad (7)$$

Figure 7:
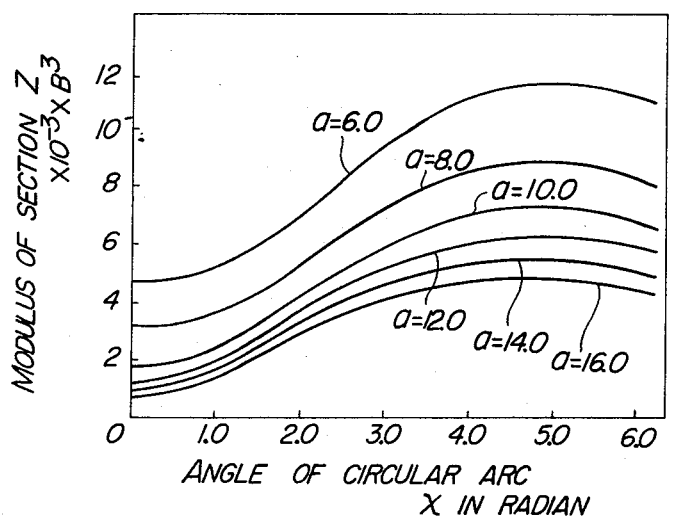
FIG. 7 is a nomograph showing the relationship between the modulus of section and the angle of circular arc.

Using Equation (7) above, a nomograph showing the relationship between Z and $x$ was prepared, with $a$ as parameter, on flat spring steels of various widths and thicknesses, which is shown in FIG. 7. As may be seen in FIG. 7, the modulus of section Z varies with the angle $x$ of the circular arc, namely it becomes large as the $x$ becomes large, and reaches the maximum value when the $x$ is 4.5 – 5.5, though variable depending upon $a$. For instance, the modulus of section Z of a leaf spring of $a = 10.0$ increases to about 3.6 times that of a flat steel bar ($x = 0$) of the same $a$ when $x$ is 3, and it will be seen that the effect of forming the leaf spring into a circularly arcuate transverse cross-section is great. Namely, it will be understood that the strength of a flat steel bar can drastically be increased by shaping it into a circularly arcuate transverse cross-section.

Figure 8:
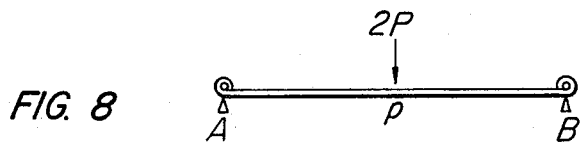
FIG. 8 is a schematic diagram of the leaf spring.

Now, let us consider the bending moment M. FIG. 8 is a schematic diagram of a semi-elliptic spring in a loaded condition, which is simply supported at the opposite ends thereof. Reference character p designates a loading point at the center between the opposite ends A and B, and a load of 2P is exerted on the spring at said loading point p.

Figure 9:
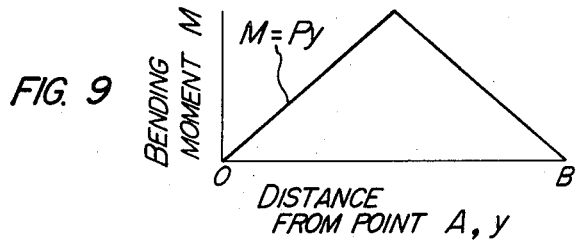
FIG. 9 is a diagram showing the bending moment in the leaf spring.

FIG. 9 is a diagram showing the bending moment applied to the spring of FIG. 8, and the axis of ordinate represents bending moment M and the axis of abscissa y represents the longitudinal distance of the spring from one end A of the spring, which is the origin of coordinates, towards the other end B of the same. In the diagram, the bending moment M applied to the distance Ap can be represented by the following equation:

$$M = P \cdot y \quad (8)$$

Hereunder, the spring will be analyzed design wise as a single leaf spring with uniform maximum tensile stress, using Equations (1), (7) and (8). When a bending load is applied to the spring, the bending moment M varies according to the longitudinal distance y as will be seen from Equation (8). Therefore, in order to make the maximum tensile stress uniform throughout the length of the spring, it is necessary to vary the modulus of section Z in accordance with the varying bending moment M as will be apparent from Equation (1).

The most important feature of the leaf spring according to the present invention is that the modulus of section is varied by shaping the leaf spring into a circularly arcuate transverse cross-section and varying the radius of curvature of said circularly arcuate cross-section continuously based on Equation (7) and the diagram of FIG. 7, thereby to attain the object set forth above.

Namely, once the maximum tensile stress $\sigma$ has been set, and the dimensions of the blank material used and the amount of the load applied to and the loading point of the leaf spring have been determined, the angle $x$ (radian) of the circular arc defined by the distance $y$ from the end (generally the eye of the spring) of the leaf spring will be determined from Equations (1), (7) and (8) and the diagram of FIG. 7, and thus the radius of curvature R at y will automatically be determined.

The mechanical analysis described above is applicable, not only to the semi-elliptic leaf spring but also to a leaf spring of full elliptic shape, a leaf spring of quarter elliptic shape and an asymmetrical leaf spring.

Practical examples of the present invention will be described hereunder with reference to the case wherein a single leaf spring was designed and produced:

Example 1

A leaf spring having an inter-eye distance or span of 2000 mm and a maximum tensile stress $\sigma$ of 42 kg/mm² and adapted to bear a load 2P of 500 kgs exerted thereon at the axle fixing position or the loading point p located at the center of said span, was produced from a flat steel bar having a width B of 100 mm and a thickness H of 10 mm. The angle x of the circularly arcuate shape in the transverse cross section of the spring at each longitudinal position y was calculated from the analysis shown in FIG. 7 and Equations (1) and (8). Namely, the bending moment M of the leaf spring at each longitudinal position y can be obtained from Equation (8) as a linear function of y. On the other hand, the ratio between the bending moment M and the modulus of section Z is constant because the maximum tensile stress is constant and 42 kg/mm², as will be seen from Equation (1). However, the modulus of section Z can be obtained from Equations (1) and (8) as a linear function of y. Therefore, the angle x of the circular arc at each position y can be obtained by combining the linear function Z of y and the nomograph (of $a = 10.0$) of FIG. 7 in such a manner that $\sigma$ will be 42 kg/mm².

Figure 10:
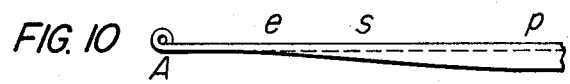
FIG. 10 is a fragmentary side elevational view of a first embodiment of the leaf spring of this invention.
Figure 11:
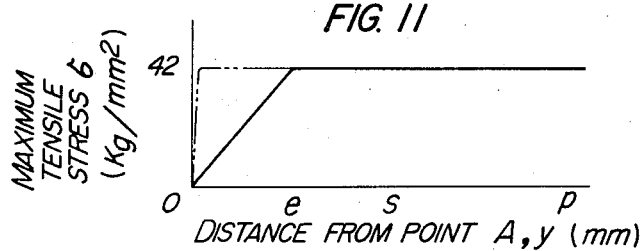
FIG. 11 is a diagram showing the maximum surface stress distribution of the leaf spring of FIG. 10.

The result is shown in FIGS. 10 and 11.

FIG. 10 shows the left half portion of the leaf spring which is symmetrical in shape with respect to the loading point p. The angle x of the circular arc at the point p is 3 radian; the angle x of the circular arc at a point 500 mm ($y = 500$) from the point A, that is the point s, is 1.45 radian; and the angle x of the circular arc at a point 263 mm ($y = 263$) from the point A, that is the point e, is 0, which means that the portion of the leaf spring from the point e to the eye is flat. FIG. 11 shows the maximum tensile stress distribution of the leaf spring shown in FIG. 10. In the diagram of FIG. 11, the axis of ordinate represents the maximum tensile stress $\sigma$ and the axis of abscissa represents the distance y from the eye.

As seen in FIG. 11, the maximum tensile stress $\sigma$ of the spring shows a linear gradient from the eye up to the point e and is constant and 42 kg/mm² beyond the point e. The weight reduction rate of this leaf spring is about 45 percent with respect to that of the conventional laminated leaf springs.

The maximum tensile stress $\sigma$ of the leaf spring may be made uniform and 42 kg/mm² throughout length as indicated by the one point chain line in FIG. 11, by progressively reducing the thickness of the spring from the point e to the eye by rolling.

Example 2

A single leaf spring embodying the present invention was produced from the same flat steel bar (100 mm in width B and 10 mm in thickness H) as used in Example 1, for comparison with the conventional laminated leaf spring (the span 1,200 mm, the design load 1,000 kgs, the maximum tensile stress 60 kg/mm², the cross section of the steel bar used 70 × 7 mm, the number of leaves 9 and the weight 26 kgs). The single leaf spring of the invention was similarly designed to have a span of 1,200 mm and a maximum tensile stress of 60 kg/mm² and to be capable of bearing a load of 1,000 kgs exerted thereon at the axle fixing position, i.e. the loading point p, located at the center of the span. The angle x of the circular arc at each longitudinal position y of the spring was obtained in the same manner as described in Example 1.

As a result, the angle of the circular arc at the center or loading point p of the spring was 2.4 radian and the angle of the circular arc at the point e 200 mm from the eye was 0 radian, namely the portion of the spring from the eye to the point 200 mm therefrom was flat. The weight of the spring was 11 kgs.

The stress distributions in the longitudinal direction of the single leaf spring of the instant invention and the conventional laminated leaf spring under loads of 500 and 1,000 kgs respectively were measured, with the results shown in Table 1.

TABLE 1

| Type of spring | Load (kg.) | Maximum tensile stress $\sigma$ (kg./mm.²) at distance y from the eye of— | | | | | | |
|---|---|---|---|---|---|---|---|---|
| | | 0 mm. | 200 mm. | 400 mm. | 600 mm. | 800 mm. | 1,000 mm. | 1,200 mm. |
| Single leaf spring of this invention | 500 | 0 | 29.3 | 30.0 | 31.1 | 29.3 | 29.3 | 0 |
| | 1,000 | 0 | 59.7 | 60.0 | 61.9 | 58.7 | 59.1 | 0 |
| Conventional laminated leaf spring | 500 | 0 | 24.9 | 25.9 | 30.2 | 26.5 | 24.9 | 0 |
| | 1,000 | 0 | 48.5 | 53.1 | 62.1 | 53.4 | 50.6 | 0 |

Figure 12:
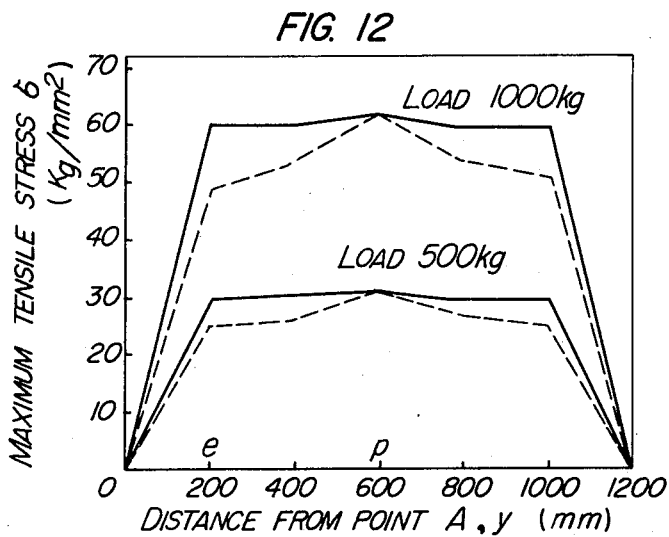
FIG. 12 is a diagram showing the maximum surface stress distribution of a second embodiment of the leaf spring.

The measured values of maximum tensile stress shown in Table 1 above were plotted in the diagram of FIG. 12, in which the solid lines represent the maximum tensile stress distributions of the leaf spring according to this invention and the broken lines represent the same of the conventional laminated leaf spring under the respective loads. As shown, the maximum tensile stress of the leaf spring of this invention under a load of 1,000 kgs is constant and 60 kg/mm², and further the weight reduction ratio thereof is about 60 percent of that of the conventional laminated leaf spring. From this, it will be obvious that the leaf spring according to the invention is much superior to the conventional laminated leaf spring.

As will be understood from Examples 1 and 2, the leaf spring of the instant invention can be easily produced by shaping a flat steel bar by means of hot pressing, and the actual measurements well coincide with the theoretical values.

The leaf spring of the invention is also advantageous in that, when the leaf spring is subjected to a shot peening or the like treatment, the effect of such treatment can be obtained uniformly over the entire surfaces of the leaf spring undergoing a tensile stress, including the flat surfaces and edge surfaces, without any fear of formation of small notches which can be the origins of fatigue fracture, owing to the fact that the surfaces of the leaf spring are curved.

Furthermore, since the leaf spring of the invention is circularly arcuate in the transverse cross section and hence it takes the maximum tensile stress only at the top of the circular arc, the change of occurrence of an origin of fatigue fracture is slim relative to springs having flat surfaces, such as the conventional laminated leaf springs and channel-shaped springs. Consequently, the fatigue strength of the subject leaf spring is greater than that of the conventional leaf springs.

Figure 13:
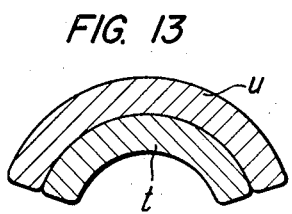
FIGS. 13 and 14 are cross-sectional views exemplifying the leaf spring of the invention used as laminated leaf springs respectively.
Figure 14:
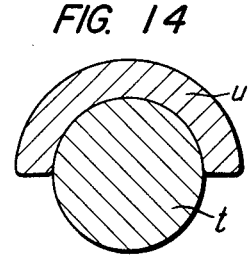

The leaf spring of the instant invention may be used as a laminated leaf spring as exemplified in FIGS. 13 and 14 in transverse cross-section. FIG. 13 shows an example in which a shorter or adjoining leaf t is curved complementary to the compressive face of a main leaf u and fitted to the underside of said main leaf. FIG. 14 shows an example in which a shorter or adjoining leaf t is circular in transverse cross-section.

As may be understood from these examples, the leaf spring of this invention can be combined with a spring of different cross-sectional shape for use as a laminated leaf spring, without deviating from the spirit of the present invention.

From the foregoing description, it will be clearly understood that the leaf spring of the instant invention is easy to design and produce, is superior to the conventional laminated leaf spring in strength and fatigue strength and hence in efficiency, and further is much lighter in weight than the conventional ones, the weight reduction ratio being about half of that of the latter. Thus, the present invention is of great practical value.

We claim:

1. A leaf spring adapted to be suspended from a vehicle frame at both ends and loaded at the midportion thereof and having a circularly arcuate shape in transverse cross section with its convex side directed upwardly, the radius of curvature of said circularly arcuate shape being continuously increased with the bending moment progressively decreasing towards the ends of the spring from the mid-portion where said bending moment is largest, so that the maximum tensile stress may be uniform over the substantial length of the spring.

2. A leaf spring according to claim 1, wherein the angle $x$ of the circularly arcuate shape at each longitudinal point of the leaf spring satisfies the equation $$Z = \frac{\frac{1}{8}\left(\frac{4}{ax^3}+\frac{1}{a^3x}\right)(x+\sin x) - \frac{1}{a}\left(\frac{2}{x^2}+\frac{1}{6a^2}\right)^2 \sin^2 \frac{x}{2}}{\left(\frac{1}{x}+\frac{1}{2a}\right)-\left(\frac{2}{x^2}+\frac{1}{6a^2}\right)\sin \frac{x}{2}} \cdot B^3$$

wherein $Z$ is the modulus of section corresponding to the varying bending moment $M$, $B$ is the width of the leaf spring and $a$ is the width to thickness ratio of the leaf spring, and the radius of curvature $R$ of said circularly arcuate shape satisfies the equation $$B = B/x.$$

3. A leaf spring according to claim 1, including a second leaf laminated therewith.

* * * * *